T. J. HOLMES.
ATOMIZERS.

No. 180,029. Patented July 18, 1876.

UNITED STATES PATENT OFFICE.

THOMAS J. HOLMES, OF BOSTON, MASSACHUSETTS.

IMPROVEMENT IN ATOMIZERS.

Specification forming part of Letters Patent No. 180,029, dated July 18, 1876; application filed June 7, 1876.

*To all whom it may concern:*

Be it known that I, THOMAS J. HOLMES, of Boston, Massachusetts, have invented a new and useful Improvement in Valves for Atomizers, &c., which improvement is fully set forth in the following specification and accompanying drawing.

The object of my invention is to provide the elastic bulbs of atomizers, syringes, &c., with a simple and cheap inlet and valve, which shall be durable, and not liable to leak air either through or around it.

My invention consists in a short hollow cylinder or tube, provided at one end with a head or flange, of greater diameter than the body thereof, and a valve at either end of the tube, in combination with an annular nut or cap, screwing upon the outer end of said cylinder, or upon a flange formed thereon, and adapted to clamp the elastic material of the bulb between the edge of the nut and the head or flange upon the opposite end of the cylinder, so as to form a tight joint.

In atomizers of ordinary construction it is common to insert the inlet-valve tube into a suitable hole in the elastic bulb, where it is held only by the constriction of the rubber and by the resistance offered by the enlarged heads. It is obvious that with such an arrangement there will be great danger of the escape of air between the tube and the rubber, which, increasing with use, soon renders the entire device practically worthless. My improvement remedies this evil by compressing the rubber adjacent to the hole between the annular nut and the inner head.

Figures 1, 2:
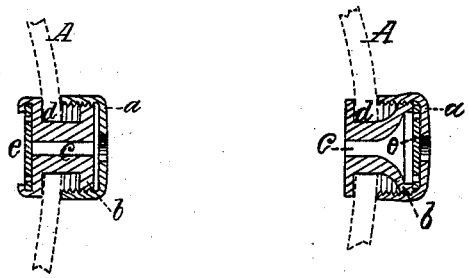
Figure 3:
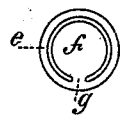
Figure 4:
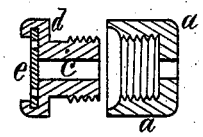

In the drawing, Figure 1 is a longitudinal section, showing the valve in the inner head. Fig. 2 is a similar view, with the valve in the outer cap or nut, and Fig. 3 is a plan of the valve detached. Fig. 4 is a section view, in which the outer flange is omitted.

$a$ is the annular nut or cap, screwing upon the outer head $b$ of the hollow cylinder $c$, which is provided at its other end with a head, $d$.

In Fig. 1, the head $d$ is recessed to form a seat for the valve $e$, which is held in place by turning over the edge of the surrounding metal slightly. The head $d$, with the valve in it, is forced through a small aperture in the elastic bulb A, and this elastic material hugs the central part $c$ of the cylinder, and is itself compressed between the head $d$ and nut $a$.

The valve $e$ is cut in circular form from a thin sheet of rubber or packing, and from this blank is removed a crescent or C shaped piece, leaving a rim of proper size to fit the recess in the head $d$ or the cavity in the nut $a$, and having a central body, $f$, attached to the rim by a narrow neck, $g$, so as to serve as a lid or cover for the aperture through the cylinder $c$ or the cap $a$.

In Fig. 2, the valve $e$ is shown at the other end of the tube, in the space between the cap $a$ and the head $b$, where it serves to close the aperture in the cap. In this case the head $b$ is recessed, so as to give the valve free play at the center in case its rim is compressed between the adjacent parts; or a ring of wire may be interposed in the cap $a$, between the valve-rim and the head $b$, for the same purpose; and the inner surface of the nut $a$ may be slightly grooved, so as to retain the valve in position when the nut is removed from the tube.

In practice, I find the construction of my device as shown in Fig. 1 to be the most desirable.

The flanged tube $b\ c\ d$ is formed, preferably, from a solid rod, having a diameter equal to that of the head $d$. The end $d$ is first centered correctly, and the cylinder bored. Then the recess for the valve, Fig. 1, is formed in the head $d$. Next, the body of the cylinder is turned down or reduced in diameter, leaving the heads or flanges standing out at right angles thereto, the diameter of $b$ being somewhat less than that of $d$. At the same time the edge of the metal surrounding the valve-seat is turned over to embrace the valve-rim, and immediately afterward the cylinder is severed from the rod, and the thread cut upon the periphery of the flange $b$. With a machine fitted for this work, these several processes follow each other with great rapidity and precision.

In forming the tube of Fig. 2, I first recess the head $b$, then bore the tube, cut the thread thereon, reduce the diameter along the center, and, finally, sever it outside the head $d$.

The cap $a$ is likewise formed from a solid rod, by first boring out the center sufficiently to leave a projecting annular rim, within which a thread is cut to fit the thread upon the flange $b$. Then the central aperture is formed, and the cap severed from the rod, fully formed.

The annular rim presses against the elastic bulb, and pinches it between itself and the head $d$. The cap serves not only to make an air-tight joint between the inlet-tube and the bulb, but gives an exceedingly ornamental finish to the whole. If preferred, it may be struck up from sheet metal, in a manner well known; but I obtain the best results by the former method.

If the annular nut is made thick and heavy, with a projecting outer rim, it may screw directly upon the tube $c$, as in Fig. 4, thus dispensing with the head $b$.

I claim as my invention in atomizers, &c.—

1. The combination of an inlet-tube having a head or flange at both ends thereof, an open annular nut screwing upon one of said heads, so as to pinch the rubber between itself and the opposite head, and a valve at either end of said tube, opening and closing the inlet to the bulb, substantially as set forth.

2. The combination of an elastic bulb and a valve with an inlet-tube, provided upon its inner end with a head or flange, and having an annular nut screwing upon its outer end, substantially as set forth.

THOS. J. HOLMES.

Witnesses:
A. H. SPENCER,
C. G. KEYES.